(12) United States Patent
Matic

(10) Patent No.: US 8,826,233 B2
(45) Date of Patent: Sep. 2, 2014

(54) GRAPHICAL REPRESENTATION OF A JAVA BYTECODE

(75) Inventor: Dragan Matic, Odenheim (DE)

(73) Assignee: SAP AG, Walldorf (DE)

( * ) Notice: Subject to any disclaimer, the term of this patent is extended or adjusted under 35 U.S.C. 154(b) by 1096 days.

(21) Appl. No.: 12/274,278

(22) Filed: Nov. 19, 2008

(65) Prior Publication Data

US 2010/0125833 A1    May 20, 2010

(51) Int. Cl.
G06F 9/44    (2006.01)

(52) U.S. Cl.
CPC ........................................ *G06F 8/75* (2013.01)
USPC .......................................................... 717/125

(58) Field of Classification Search
CPC ........... G06F 9/443; G06F 8/75; G06F 8/443; G06F 11/3664
USPC ....................................................... 717/125
See application file for complete search history.

(56) References Cited

U.S. PATENT DOCUMENTS

| 6,509,898 B2 * | 1/2003 | Chi et al. ........................ 345/440 |
| 2003/0018957 A1 * | 1/2003 | Bates et al. .................... 717/129 |

OTHER PUBLICATIONS

Wurthinger, "Visualization of Java Control Flow Graphs", Oct. 2006, p. 1-49.*
Vincenzi, "JaBUTi Java Bytecode Understanding and Testing", Mar. 2003, p. 1-63.*
Wimmer, "Java HotSpot™ Client Compiler VisualizerUser Guide", 09/22/207, p. 1-11.*
Zhao, "Analyzing Control Flow in Java Bytecode", Sep. 1999, p. 1-6.*
Korhonen, "Visual Algorithm Simulation" , Nov. 21, 2003, 138 pages.*
Dr. Garbage, "Sourcecode Visualizer 2008—Bytecode Visualizer 2008", Aug. 20, 2008, p. 1-3.*

* cited by examiner

*Primary Examiner* — Li B Zhen
*Assistant Examiner* — Duy Khuong Nguyen
(74) *Attorney, Agent, or Firm* — Blakely Sokoloff Taylor & Zafman LLP

(57) ABSTRACT

A method and system for graphing JAVA bytecode. JAVA bytecode is analyzed to identify blocks of bytecode that are consecutively executed without being targeted by branching instructions. The links in the form of branching instructions or target based breaks are also identified. The blocks and links are then graphed to facilitate the review and debugging of the program. The graph can be optimized to improve the readability of the graph.

18 Claims, 5 Drawing Sheets

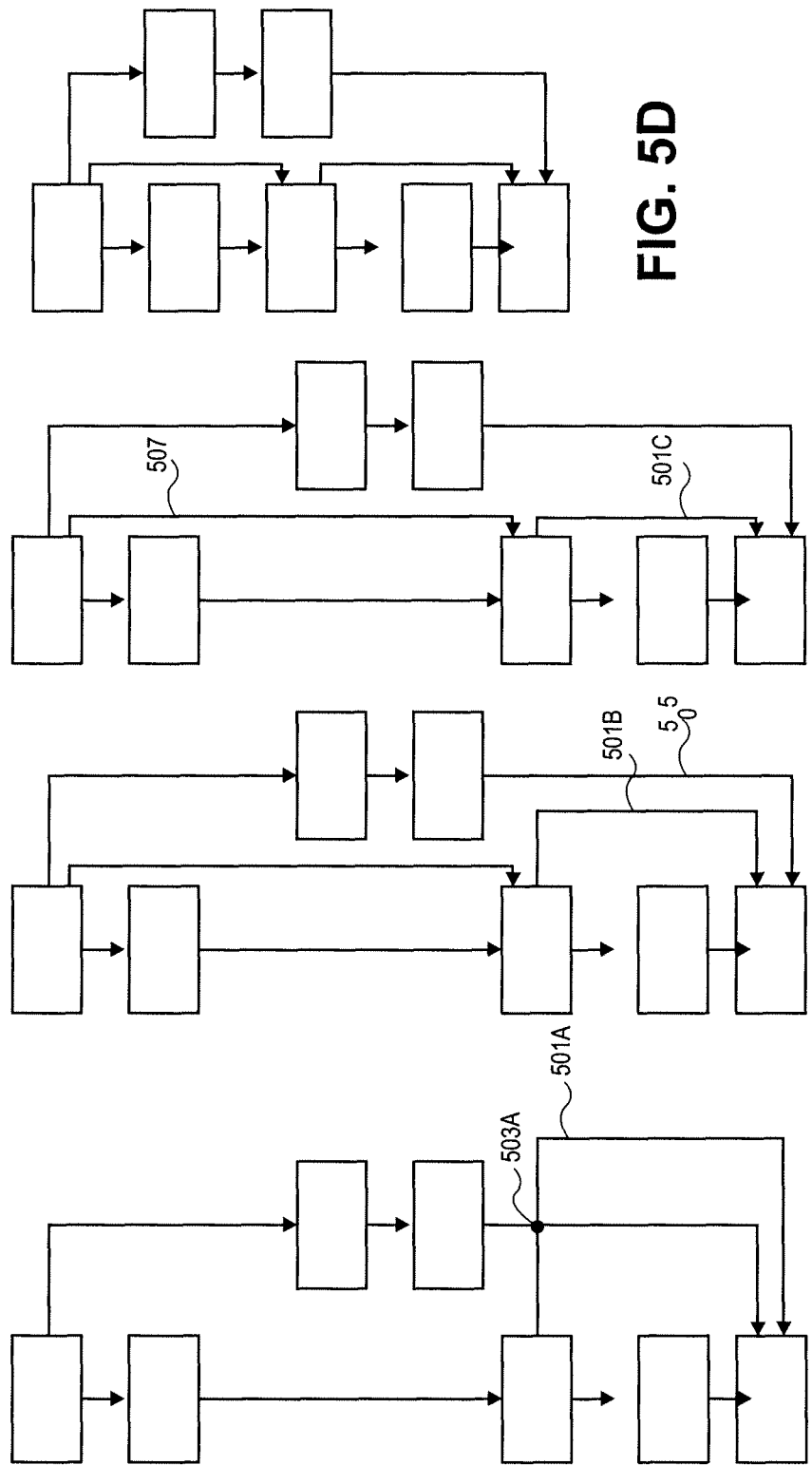

GRAPHICAL REPRESENTATION OF A JAVA BYTECODE

BACKGROUND

1. Field of the Invention

The embodiments of the invention relate to debugging tools. Specifically, the embodiments of the invention relate to a method and system for generating a graphical representation of JAVA bytecode.

2. Background

Debugging tools for JAVA programs rely on the execution of the program in a development environment and the insertion of debugging specific instructions within the source code of the JAVA application. Inserting these instructions into the source code requires significant programmer effort. Executing these debugging specific instructions is computationally intensive and requires the use of extra computational resources. The speed of execution of the program is diminished. The JAVA virtual machine must also be run in a debug mode and the source code must be compiled with a debugging setting. Making these changes or having this control is not always possible or efficient.

Further, when an error occurs and the debugging instructions are utilized to generate a trace or print a stack related to the program, a large amount of trace data is generated that is difficult for a human being to review and utilize. A large amount of data is presented in a log or text file where it is difficult to see the inter-relationship between the different aspects of a program when viewing this trace file. This obscures the underlying errors that cause any exception that is being debugged.

Debugging tools do not provide an overview of the structure of a program based on analysis of the JAVA bytecode. Development environments and debugging tools display the source code for a program. The development environments and debugging tools do display the inter-relationships between classes and methods of a program and other programs based on an analysis of the calls and importing features of the source programs. However, if the source code and importation data are not available, such as when working with programs already compiled in JAVA bytecode, then these applications cannot assist the user.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIGS. 5A through 5D illustrate the representation of JAVA bytecode as a set of graphical blocks and the process for manipulating these blocks to create a compact and easy to read representation of the program.

DETAILED DESCRIPTION

Figure 1:
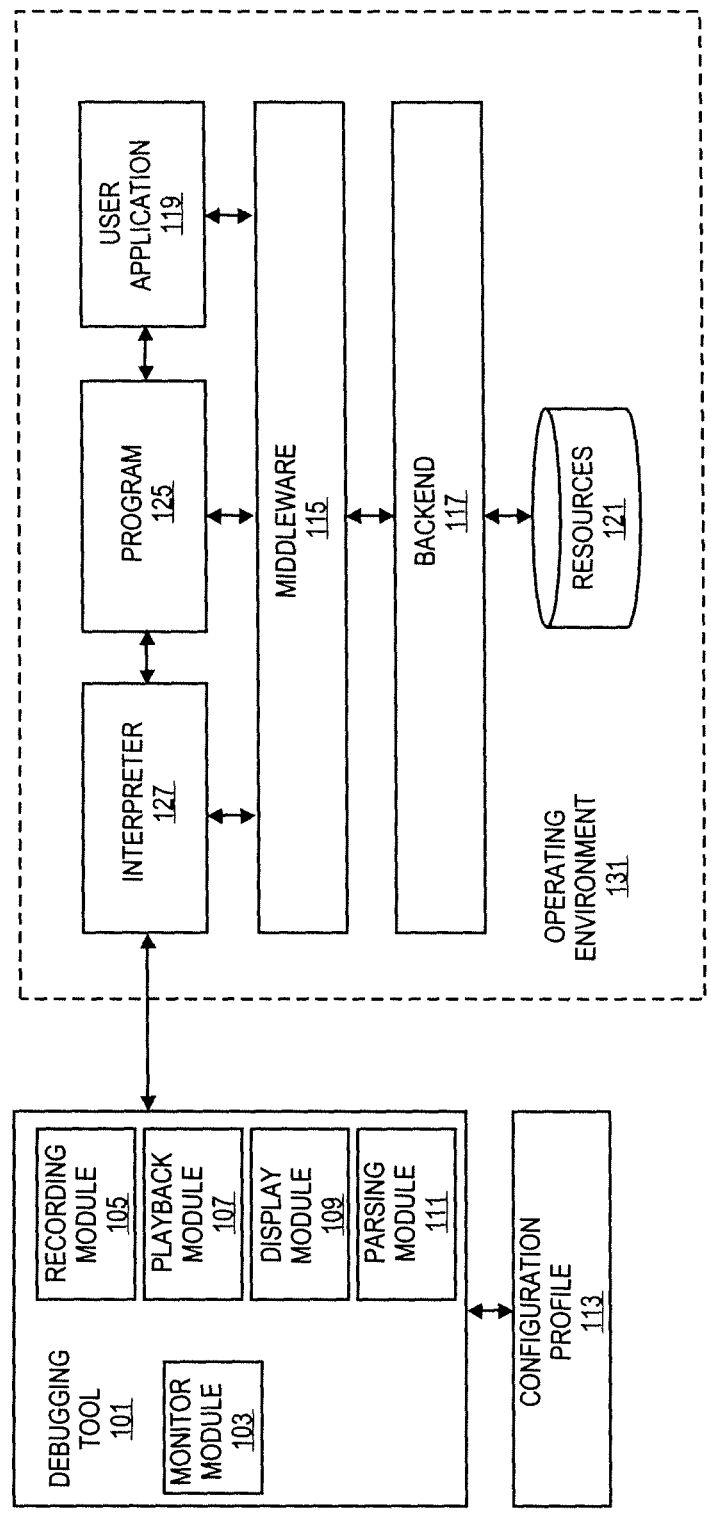
FIG. 1 is a block diagram of one embodiment of a system for generating a graphical representation of JAVA bytecode.

FIG. 1 is a diagram of one embodiment of a system for generating a graphical representation of JAVA bytecode. JAVA bytecode is a compiled form of the JAVA programming language developed by SUN Microsystems, Inc. of Santa Clara, Calif. The system includes a debugging tool 101 and a program 125 running in program operating environment 131. The debugging tool 101 interacts with the program operating environment 131 to monitor the execution of a program 125 in the program operating environment 131. The program 125 being monitored is a JAVA program that is being executed and is in the form of JAVA bytecode. The original JAVA source code is not required for purposes of tracing the JAVA bytecode. The program 125 can run in its real world environment, as represented by the program operating environment 131. This allows debugging outside of a development environment without having to run a JAVA virtual machine (JVM) in a debugging mode or compiling the program 125 specifically for debugging. The program 125 can be any type of program including a user application, middleware 115, backend software 117 or similar software modules. The program 125 can also be a client application, a server application or a component of a distributed application. The program 125 can interact with user applications 119, middleware 115 or backend software 117 to access resources 121.

The program operating environment 131 is executed on a server platform, a workstation, in a distributed environment or in a similar computing environment. Computers in a distributed environment can communicate over a local area network (LAN), a wide area network (WAN) or similar network. The same program operating environment 131 can execute the debugging tool 101. In another embodiment, the debugging tool 101 executes in a separate program operating environment networked to the program operating environment 131.

In one embodiment, the debugging tool 101 is assisted in the monitoring of the program 125 through a set of interpreters 117 in the program operating environment 131. A 'set,' as used herein, refers to any positive whole number of items including one item. In one embodiment, the interpreter is in a second language that is used by the debugging tool 101 to interact with the executing JAVA program. For example in one embodiment the interpreter 117 is a CLApp interpreter by SAP Aktiengesellschaft of Waldorf, Germany. In another embodiment, the interpreter 117 can be a specialized JAVA program or modification to a JAVA virtual machine.

The debugging tool 101 can include a monitor module 103, recording module 105, playback module 107, display module 109, and parsing module 111. Each of these modules may be separate program or may be components of a larger program. Any combination of these modules may interact with a configuration profile 113. The configuration profile 113 can include settings for each of the respective modules. In one embodiment, the configuration profile 113 also includes a set of instructions or batch information to automate or drive the monitoring of a program 125.

A monitor module 103 manages the communication between the debugging tool 101 and the interpreter 117 that interact and monitor the status of the program 125 and related environmental variables in the program operating environment 131 during the execution of the program 125. The module 103 can also drive and control the interaction between the other modules in the debugging tool 101 such as the recording module 105, playback module 107, display module 109 and parsing module 111. The monitor module 103 can be instanced such that each program 125 that is monitored or each monitored sub-component of the program 125 is tied to or managed by a separate monitor module 103 instance. The monitor module 103 can also interact with the display module 109 to provide the user interface for the debugging tool 103 through which the user can view variable information, stack information and similar information regarding the program 125. Also, the user can manage the recording and playback of the execution of the program 125 through display module 109 and monitor module 103.

A recording module 105 interacts with the executing program 125 to record each of the steps in the execution of the program. As the program executes, the recording module 105 logs each of the steps of the program 125. The recording module 105 can receive an update on the progress of the program 125 through the interpreter 117, as well as, the monitor module 103. The recorded steps of the execution of the program 125 can then be re-executed by the playback module 107 to allow the user to move to any point in the execution of the program 125 for purposes of viewing the variable values and similar state information for debugging errors that occur during the execution of the program 125.

The playback module 107 can move the progress of the recorded execution of the program 125 forward or backward by any number of steps. This can be done by the user of the debugging tool 101, who can set the automated pace for progressing through the program 125 or can set a particular spot or range in the program 125 over which the playback is to occur by setting a program counter or similar indicator of a location in the program 125 being monitored. The user can interact with the playback module 107 through a graphical user interface provided by the display module 109 and monitor module 103 or similar component of the debugging tool 101.

The parsing module 111 takes the bytecode of the program 125 being monitored to identify the function of each bytecode within that program 125 and identify a set of instruction blocks. The parsing module 111 identifies branches, jumps, calls and the targets of these branches, jumps and calls to identify blocks of instructions in which sequential execution is ensured. The parsing module 111 also identifies the inter-relationships between the blocks. The block information is determined during the recording of the program execution or during a similar timeframe where the interpreter 117 provides the JAVA bytecode for analysis. The block and inter-relationship data can then be used to generate a graphical representation of the JAVA bytecode.

The parsing module 111 also maintains a data structure that tracks the variable state of each variable and method of the program 125 and similar information related to the program 125 as it is received from the interpreter 117. The parsing of the bytecode allows the monitor module 103 to display the instructions to the user through the display module 109 and to allow the user to designate locations in the bytecode to stop or monitor the execution. In addition, the parsing module 111 can assist in directing the interpreter 127 to insert trace instructions into the bytecode to enable the playback, recording and monitoring directed by the user.

The display module 109 generates the graphical user interface for viewing the JAVA bytecode in a graphical form by relying on the data collected and provided by the parsing module 111 and the interpreter 117. The display module 109 can also generate a user interface for interacting with the other modules including the recording module 105, playback module 107 and monitor module 103. The display module 109 could also display other environmental variable information related to the debugging of the program 125 including stack trace information, method information, progress information, exception information and similar information relevant to debugging the program.

Figure 2:
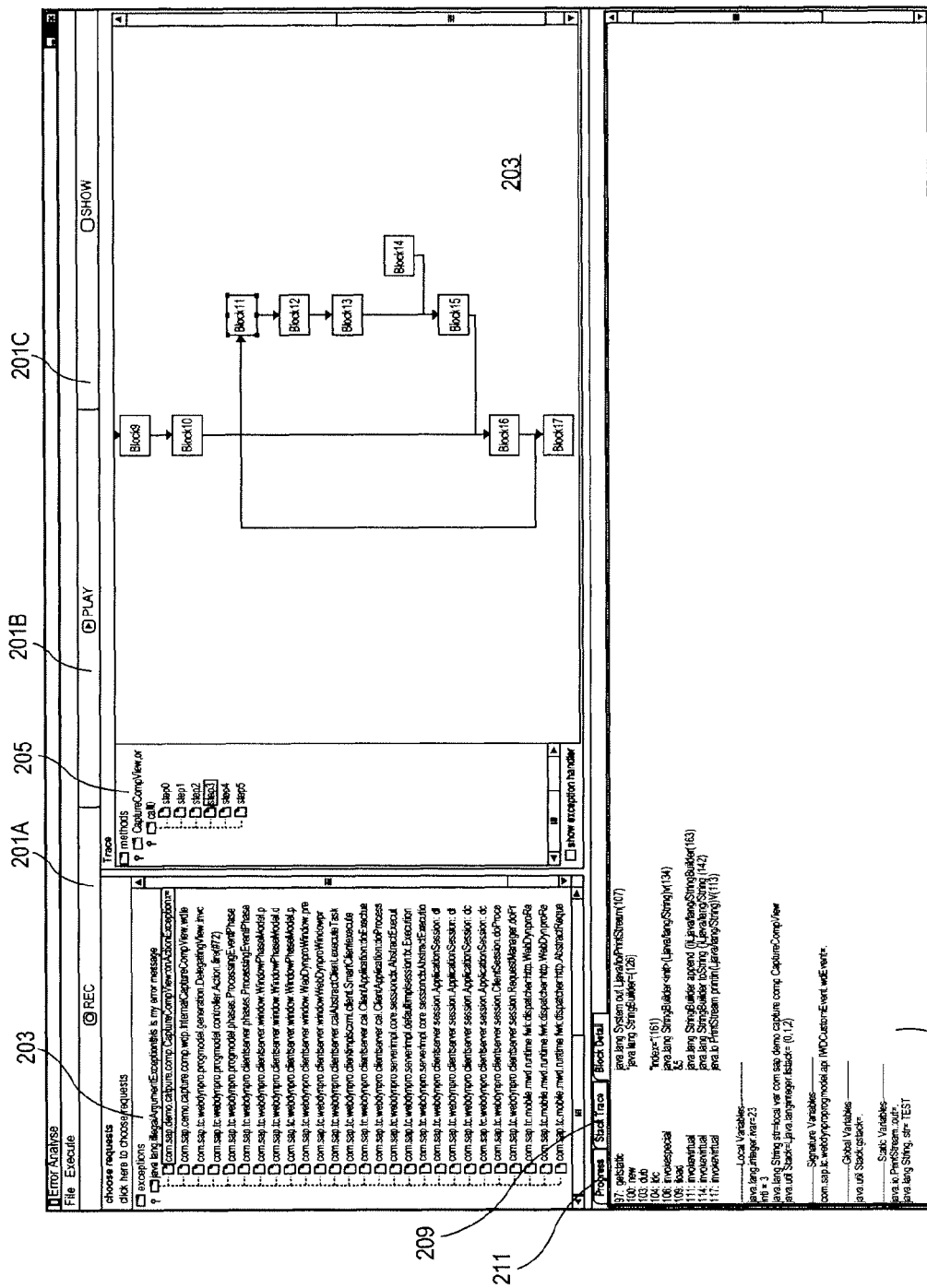
FIG. 2 is an illustration of one embodiment of a graphical user interface for the debugging tool.

FIG. 2 is a block diagram of one example embodiment of the user interface for the debugging tool. The user interface in this example is composed of a set of windows or similar user interface mechanisms. In another embodiment, a single unified interface is presented. The user interface can include an exception display window 203, recording and play back user interface elements 201A and 201B, a trace window 205, a block display window 213, a block display toggle element 201C, a block detail window 207, a stack tracer 209 and a progress window 211.

The exception display window 203 displays a listing of exceptions or similar errors that have been encountered in the execution of a particular program, class or method. The exception information can include the approximate location of the occurrence of the exception in the program, information about the timing of its occurrence and similar information. Exception information can be organized into a hierarchical tree or similar data structure. The exceptions can also be grouped by type or similarly organized to assist the programmer in identifying related errors.

The record button 201A can be used to trigger the logging of the execution process for a selected program. The record button 201A can toggle this functionality on and off. The user can then select the play button 201B to initiate a process for playback of recorded aspects of the execution of the selected program. The play button 201B can be toggled on and off to initiate and pause the playback of the program execution. In other embodiments, other user interface mechanisms other than buttons can be utilized to control the recording and playback functionality. Other user interface mechanisms include sliders or data fields that allow the user to specify a specific instruction range to be recorded or played back.

The trace window 205 can display the overall hierarchy of the execution on an entire program or a subset of the program such as a class or method. The hierarchy can be displayed in terms of the program execution such that a set of executed calls that correspond to recorded program execution including the method calls that occurred during the recording process are displayed in the window. Also, the current position for the playback within the hierarchy, for example, the last called method can be displayed. This user interface element can be utilized to change the currently displayed graphic representation level. The graphical representation of the JAVA bytecode in the graphical interface window 213 corresponds to a specific layer of a method, class or a program that is being played back or recorded. If the user wants to view a block diagram corresponding to a lower level of the program hierarchy, for example, corresponding to a call to a further method or operation within a program, then that call can be highlighted in the trace window 205. Selecting the call in the trace window 205 will bring up the block diagram for the called method.

The graphical interface window 213 shows each of the identified blocks in a series of columns and rows. Each of the blocks in a single column represents relationships where the links that inter-relate the blocks in the column are defined as 'main links.' Main links are links between the two blocks that are based on a goto, jump, branch fail or similar instruction that causes the execution to continue according to the link between the blocks. Blocks placed in separate columns are inter-related to one another based on 'secondary' or 'bridge' links. Bridge links denote the relationship between blocks designated by the try and catch pattern in JAVA code. Secondary links denote those links designated by if then statements, branch success, switches or similar instructions in the bytecode. Similarly, upward links appear between blocks in the same column indicating a target for a branch, switch or similar instruction that forms a loop. The show button 201C can be utilized to toggle on and off the display of the graphical interface window 213 including the block diagram of the JAVA bytecode or any other aspect of the graphical user interface. In one embodiment, the show button 201C toggles views between display of bytecode and display of the graphical representation of the bytecode.

The block detail window 207 can display the statistics of a currently highlighted block in the graphical user interface 213. The block details can include the static variables associated with the block as well as global variables, local variables, method calls, instruction count, API association, accessed resources and similar aspects of the instructions in the bytecode corresponding to a block in the graphical interface window 213.

A stack trace window 209 for the program displays a stack for the program at a current position in the playback of the program. A progress window 311 displays the current position in the playback of the execution of the program. The stack trace window 209 can display all the elements of the stack that correspond to the current location highlighted in the form of a block in the graphical user window. Similarly the progress window can indicate a listing of executed blocks leading up to the currently selected block in the graphical user window 213.

Figure 3:
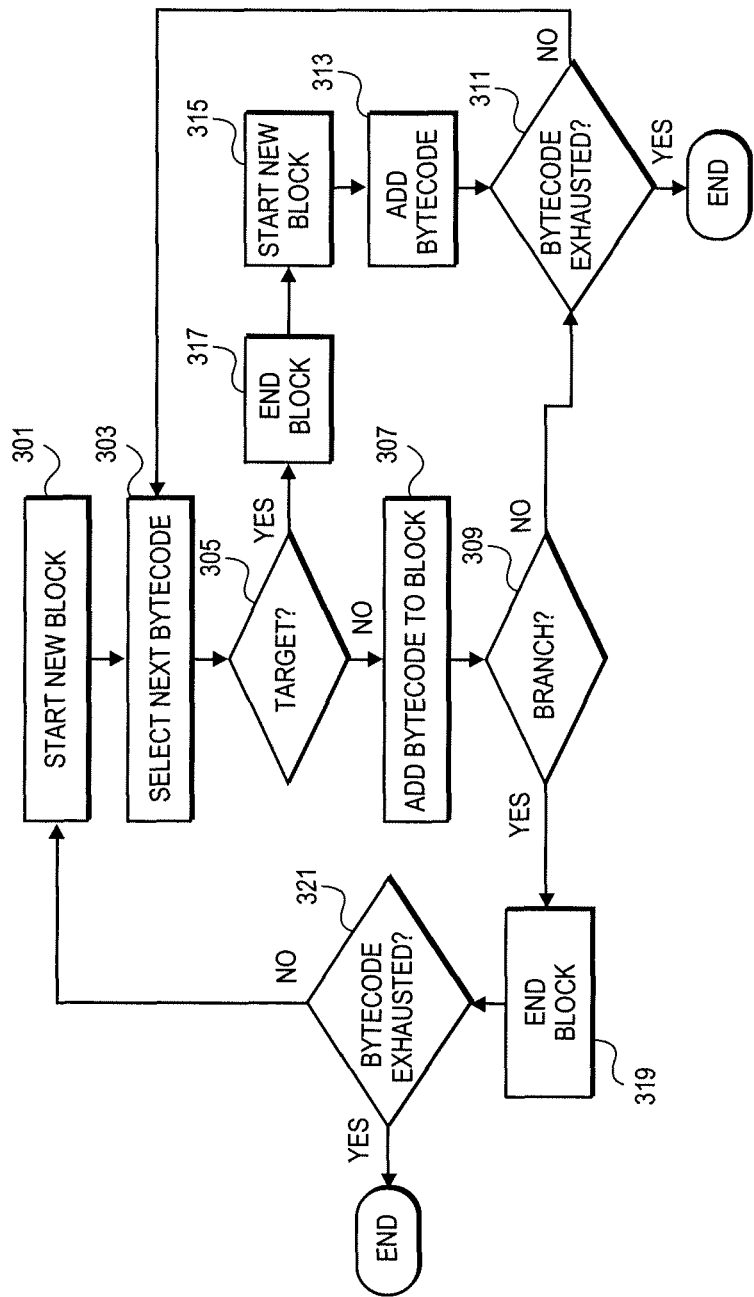
FIG. 3 is a flowchart of one embodiment of a process for identifying blocks for the graphical representation of the JAVA bytecode.

FIG. 3 is a flowchart of one embodiment of a process for identifying blocks for the graphical representation of the JAVA bytecode. The process is initiated by starting a new or first block (block 301). Each instruction in the stream received of the bytecode received by the parsing module is inserted into the newly created block as they are received and analyzed. Starting with the first received first bytecode or selecting the next bytecode in the stream (block 303), the bytecode is analyzed to determine whether it is a target of another bytecode in the stream (block 305). This may be done by searching ahead if the entire sequence of bytecodes has been recorded and is available. In another embodiment, this process can only be done as each instruction that generates a target is received, thereby forcing some blocks to be split. Targeting bytecodes are successful branch destinations, jump destinations, goto destinations, switch destinations and similar bytecode targets. If the currently selected bytecode is not a target, then the bytecode is added to the current block (block 307).

If a current bytecode is a target of another block or bytecode, then the current block is ended (block 217). A new block is started (block 215). The current bytecode is then placed in the new block (block 213). A check is made to determine whether the current bytecode is the last bytecode in the stream of the program to be analyzed (block 311). If the bytecode is the last in the stream, that is the bytecode has been exhausted, then the block identification process ends. If the bytecode is not the last in the stream, then the process continues by selecting the next bytecode for analysis (block 303).

After adding the bytecode that is not a target to the current block, the byte code is analyzed to determine whether it is a branch instruction or similar instruction with a target that is not the next bytecode in program order (block 309). If the bytecode is not a target, then a check is made to determine whether the current bytecode is the last bytecode in the stream of the program to be analyzed (block 311). If the bytecode is the last in the stream, that is the bytecode has been exhausted, then the block identification process ends. If the bytecode is not the last in the stream, then the process continues by selecting the next bytecode for analysis (block 303).

If the current bytecode is a branch instruction, then the current block is closed to prevent further bytecodes from being added to the current block (block 319). A check is then made to determine whether the current bytecode is the last bytecode in the stream of the program to be analyzed (block 321). If the bytecode is the last in the stream, that is the bytecode has been exhausted, then the block identification process ends. If the bytecode is not the last in the stream, then the process continues by starting a new block in which to place subsequent bytecodes (block 301) before selecting the next bytecode for analysis (block 303).

Figure 4:
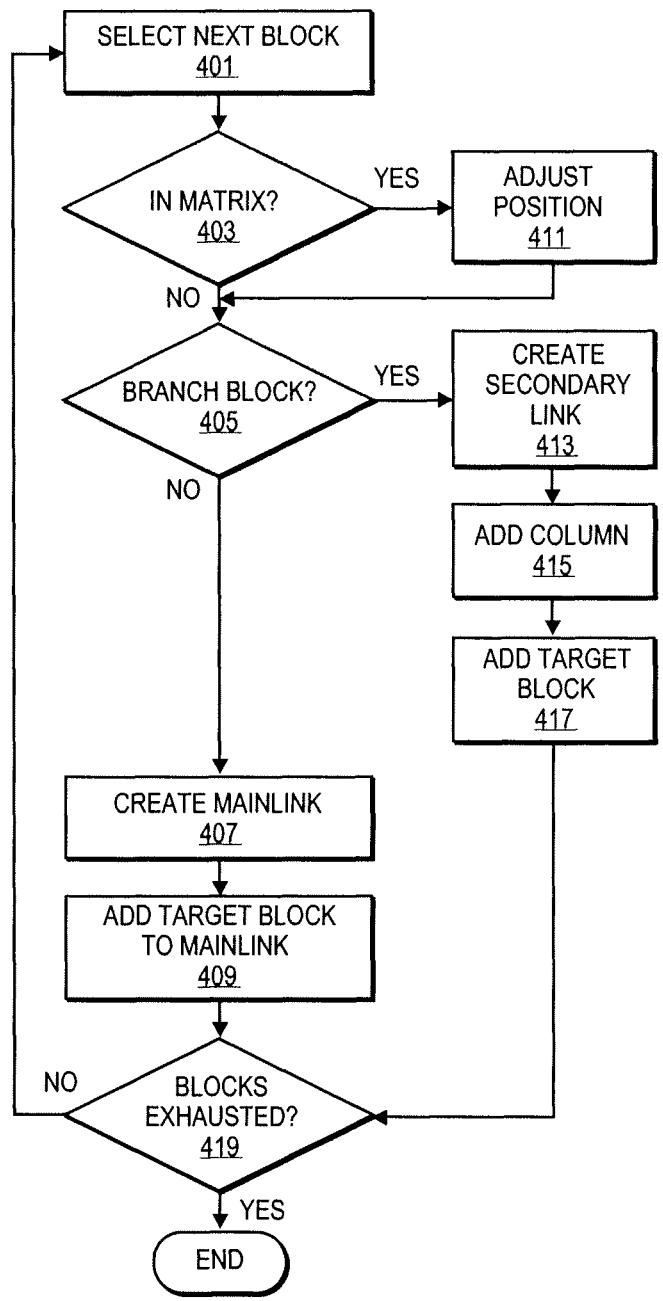
FIG. 4 is a flowchart of one embodiment of a process for generating a graphical representation of the JAVA bytecode.

FIG. 4 is a flowchart of one embodiment of a process for generating a graphical representation of a program by placing each of the blocks identified by the parsing module into a matrix. The process is initiated by the user selecting a program, method or similar aspect of a program to be graphically drawn. A parsing module parses the corresponding bytecode to identify the blocks of that bytecode by identifying each of the branching instructions as well as the targets of the branching instructions. Each block is a set of consecutively executed instructions that are guaranteed to be executed in the specified order as described above.

The process of drawing the blocks in the graphical user window begins by selecting the first block that has been identified or the next available block that has been identified (block 401). A check is then made to determine whether the currently selected block already exists in the matrix (block 403). If the block currently exists in the matrix, then the drawing position is altered to match that of the pre-existing placement of block (block 411). A block may already exist in the matrix because it was identified as a target of another block that was previously processed. A current position within the matrix is maintained throughout the execution of the graphing process. This position is maintained to allow the process to add new blocks to the matrix relative to the last added block or the last modified block in the matrix.

If the block does not exist in the matrix or the position in the graph has successfully been adjusted, then the check is determined whether or not the current block includes a branching bytecode, that is the block ends in an IF, branch or switch or similar operation. If the block does not contain a branch, then a main link is added to the block (block 407). A main link indicates that the block that follows the current block is guaranteed to be executed subsequent to the current block. The main link is added to the bottom of the current block creating a link within the same column as the current block.

The current block is then analyzed to determine whether the block ends in a goto, jump or similar operation or simply ends without any specific designation of the succeeding instruction. If no succeeding instruction is specifically identified, then it is assumed that the next instruction is in the block that contains the next instruction in program order. The block containing the instruction identified by a goto, jump or similar operation or the block corresponding to the instruction in the next program order is then added to the graph through the main link (block 409). Thus, such a block would be added immediately below the current block and linked to the current block using a main link.

It tests is made to see if all the blocks available to be drawn in the graphical interface window have been exhausted (block 419). If all the blocks have been exhausted, then the process ends and the drawing of the JAVA bytecode graph is complete. If all the blocks have not been exhausted, then the process continues with the next block in the list of identified blocks that have not yet been processed (block 401).

However, if the current block is a branch block, then for each branch a secondary link is created (block 413). The branching operation, such as an IF, branch or switch operation, generates at least one secondary link. However, a switch statement may create any number of secondary links. Each secondary link is drawn as a line to an empty column in the matrix. The column selected for the secondary link to be drawn to can be based on any selection process including selecting a column that is closest to the current column in which the current block resides. This may require the adding of new column to the matrix to accommodate the new destination of the secondary link. The destination of the branch instruction is then examined in the corresponding block that is added to the matrix at the location designated by the secondary link (block 417).

After each of the target blocks have been added to the matrix a test is then made to determine if all of the blocks have been individually examined (block 419). If all the blocks have been exhausted then the process ends. However, if all of the blocks have not been exhausted by analyzing them and placing them within the matrix with each of their links identified, then the next block in the program is identified and selected for this analysis (block 401). Blocks can be queued in any order, for example the blocks can be analyzed in program order.

FIGS. 5A-5D illustrate a specific example program that has been drawn by the process described in regard to FIG. 4. Each of the figures illustrates one of the optimizing steps utilized to create a more easily readable compact representation of the JAVA bytecode. The functions described below can be performed by the display module, parsing module or similar module. In regard to FIG. 5A this shows a basic starting point for the optimization of the graphical representation. The initial graphical representation includes several elements that make the reading and understanding of the graph more difficult. For example, the link 501A extends out into a column in which there are no blocks. Also, the two links identified at the crossing point 503A overlap, which can cause confusion as to which direction a link is traveling and which blocks are connected by a particular link. Rearranging the columns and the spacing of links can help improve the readability of the graphical representation of the JAVA bytecode. In one embodiment, each of the columns is analyzed to determine whether or not any blocks are within that column. Columns without any blocks but which contain links, may be shifted in order to place the link in a column adjacent to the originating block and/or target blocks if possible.

FIG. 5B illustrates the rearrangement of the columns in the graphical representation. The column that contained the link 501A on its vertical path has been swapped with the adjacent column such that the re-drawn link 501B is no longer causing an intersection with the link 505. This is accomplished by moving the links that were in columns by themselves to a location adjacent to the originating or target blocks. These links can be further analyzed to determine whether or not links that are in separate columns can be combined into a single column. For example, in FIG. 5C the link 501B and link 507 can be re-drawn as the link 501C in FIG. 5C. The re-drawn link 501C is now in line with the link 507. This reduces the number of columns within the matrix to improve readability.

FIG. 5D shows the further refinement of the graphical representation of the JAVA bytecode graph where excessive numbers of rows are reduced. The number of rows can be reduced by analyzing each of the blocks in program order and/or assigning them a specific ordering number. This ordering number corresponds to the location in the graph from top to bottom. The ordering number may be designated based on the row of the block. Each of the blocks may be moved up to or given a higher position in the matrix or given a smaller program number or row positioning by analyzing each of the blocks to determine whether or not it is possible to reduce the position number of the block without causing any of the existing links to overlap or disconnect from their originating or target block.

In one embodiment, the dynamic JAVA bytecode graphing system may be implemented as hardware devices. In another embodiment, these components may be implemented in software (e.g., microcode, assembly language or higher level languages). These software implementations may be stored on a computer-readable medium. A "computer-readable" medium may include any medium that can store or transfer information. Examples of a computer-readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. For example, the embodiments describe the graphing of JAVA bytecode, however, one skilled in the art would understand that the principles and components described herein could be applied to tracing errors in similar languages and operating environments. The specification and drawings are, accordingly, to be regarded in an illustrative rather than a restrictive sense.

What is claimed is:

1. A method for graphical display of bytecode of a program comprising:

displaying an execution hierarchy of the program in a trace window;

parsing, by a parsing module, the bytecode of the program to identify a set of blocks belonging to a hierarchy level of the program selected in the trace window;

assigning a first block from the set of blocks to a first position in a display matrix shown in a graphical interface window, the display matrix including a plurality of non-overlapping rows and columns;

displaying the first block in the first position in the display matrix by a display module executed by a processor of a computer system, the first block is displayed in a column that indicates a relationship between the first block and each other block displayed in the display matrix;

determining each block targeted by the first block;

displaying each block targeted by the first block with a link to the first block in the display matrix by the display module;

creating a new column in the display matrix for each block that is a target of a branching operation, each block displayed in the new column created for the block;

shifting column order of a column that contains links but not blocks to avoid link crossing; and displaying, in a block detail window, information specific to a block selected in the display matrix including static variables, global variables, and local variables associated with the selected block.

2. The method of claim 1, further comprising:

adding a non-branching block to a column of a preceding block.

3. The method of claim 1, wherein parsing the bytecode comprises:

identifying an end of a first block by identifying a branch or target.

4. The method of claim 1, further comprising:
creating a secondary link to a new column from the first block in response to detecting an if statement in the first block.

5. The method of claim 4, further comprising:
binding a destination block of the if statement to the secondary link.

6. The method of claim 1, further comprising:
reducing a number of rows in the matrix by eliminating a row without a block.

7. The method of claim 1, further comprising:
placing a second block in a row of the display matrix according to a sequence number of the second block.

8. A system for debugging a program in bytecode format comprising:
a memory device to store data;
a processor coupled to the memory device to execute a display module to display an execution hierarchy of the program in a trace window, and to execute a parsing module to identify a block in the bytecode belonging to a hierarchy level of the program selected in the trace window, and to assign the block to a position in a display matrix, the display matrix including a plurality of non-overlapping columns and rows, and the processor to further execute the display module to display a graphical representation of the block in the display matrix and a relationship with another block using a link, wherein the block is displayed in a column of the plurality of columns that indicates a relationship between the block and each other block displayed in the display matrix wherein a new column in the display matrix is created for each block that is a target of a branching operation, each block displayed in the new column created for the block and wherein column order of a column that contains links but not blocks is shifted to avoid link crossing, and to display, in a block detail window, information specific to a block selected in the display matrix including static variables, global variables, and local variables associated with the selected block.

9. The system for debugging a program of claim 8, further comprising:
a playback module to incrementally replay an execution of the program,
wherein the display module updates the graphical representation to indicate an executed block.

10. A non-transitory computer readable medium having stored therein a set of instructions, which when executed, cause the computer to perform a set of operations comprising:
displaying an execution hierarchy of a program in a user interface;
parsing bytecode of a program to identify blocks of bytecode that belong to a hierarchy level of the program selected in the user interface;
assigning each of the blocks to a position in a display matrix, the display matrix shown in the user interface including a plurality of non-overlapping rows and columns
generating a graphical display of the blocks including logical links between the blocks in the display matrix, wherein each of the blocks are displayed in a column of the plurality of non-overlapping rows and columns that indicates a relationship between each block displayed in the display matrix;
creating a new column in the display matrix for each block that is a target of a branching operation, each block displayed in the new column created for the block;
shifting column order of a column that contains links but not blocks to avoid link crossing; and
displaying information specific to a block selected from the graphical display including static variables, global variables, and local variables associated with the selected block.

11. The non-transitory computer readable medium of claim 10, having stored therein a further set of instructions, which when executed cause the computer to perform a further set of operations comprising:
displaying the blocks in a matrix format.

12. The non-transitory computer readable medium of claim 10, having stored therein a further set of instructions, which when executed cause the computer to perform a further set of operations comprising:
displaying separate branches of execution in separate columns of the display matrix.

13. The non-transitory computer readable medium of claim 10, having stored therein a further set of instructions, which when executed cause the computer to perform a further set of operations comprising:
inserting blocks into the display matrix based on a sequence number.

14. The non-transitory computer readable medium of claim 10, having stored therein a further set of instructions, which when executed cause the computer to perform a further set of operations comprising:
reducing rows of the display matrix by reassigning block sequence number by column.

15. The non-transitory computer readable medium of claim 10, having stored therein a further set of instructions, which when executed cause the computer to perform a further set of operations comprising:
rearranging columns of the display matrix to reduce link crossing.

16. The non-transitory computer readable medium of claim 10, having stored therein a further set of instructions, which when executed cause the computer to perform a further set of operations comprising:
identifying block branches and generating links for each branch.

17. The non-transitory computer readable medium of claim 10, having stored therein a further set of instructions, which when executed cause the computer to perform a further set of operations comprising:
displaying a current position in execution of the program.

18. The non-transitory computer readable medium of claim 10, having stored therein a further set of instructions, which when executed cause the computer to perform a further set of operations comprising:
displaying a location of an error in the program.

* * * * *